April 24, 1951     H. A. BOURNE     2,550,183
APPARATUS FOR MOLDING V-BELTS
Filed Nov. 14, 1946     2 Sheets-Sheet 1
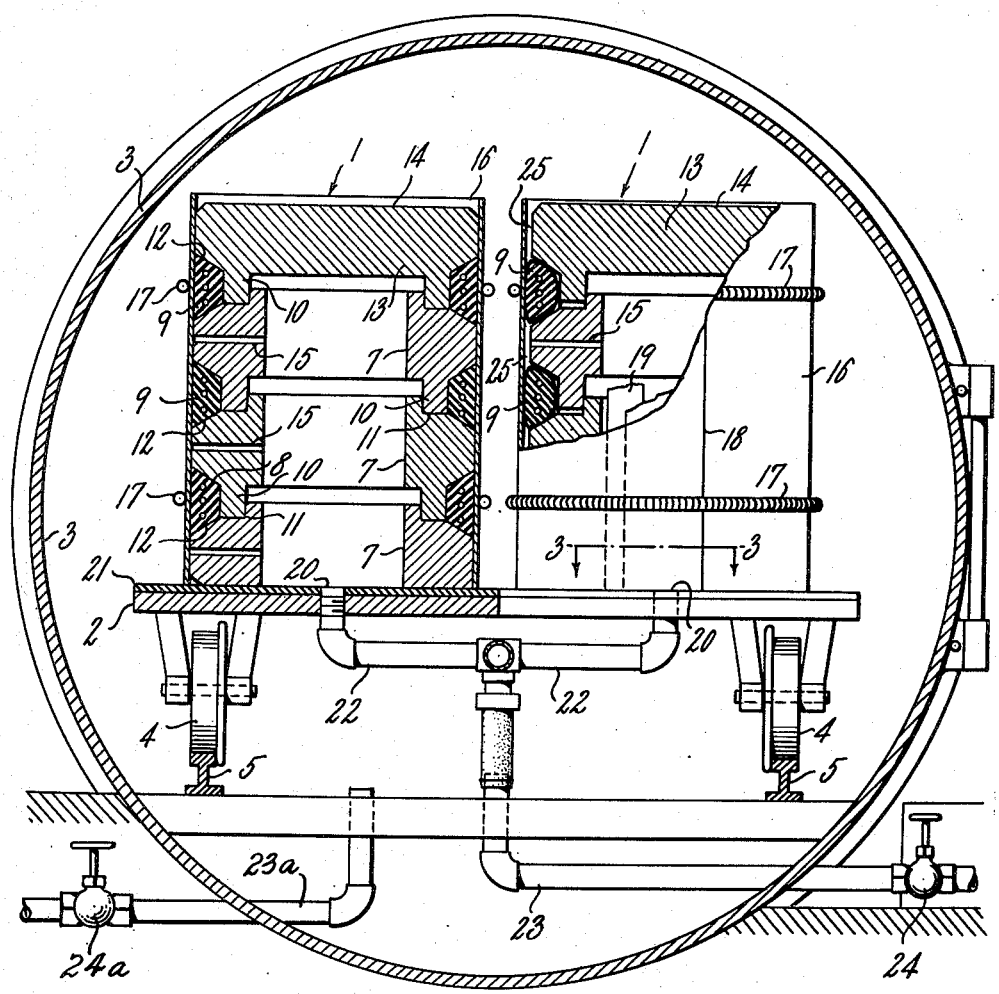
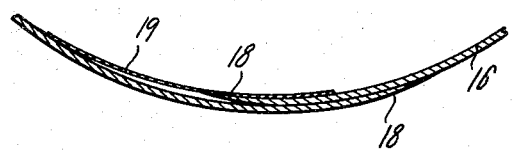
INVENTOR.
HARRY A. BOURNE
BY
Henry P. Truesdell
ATTORNEY

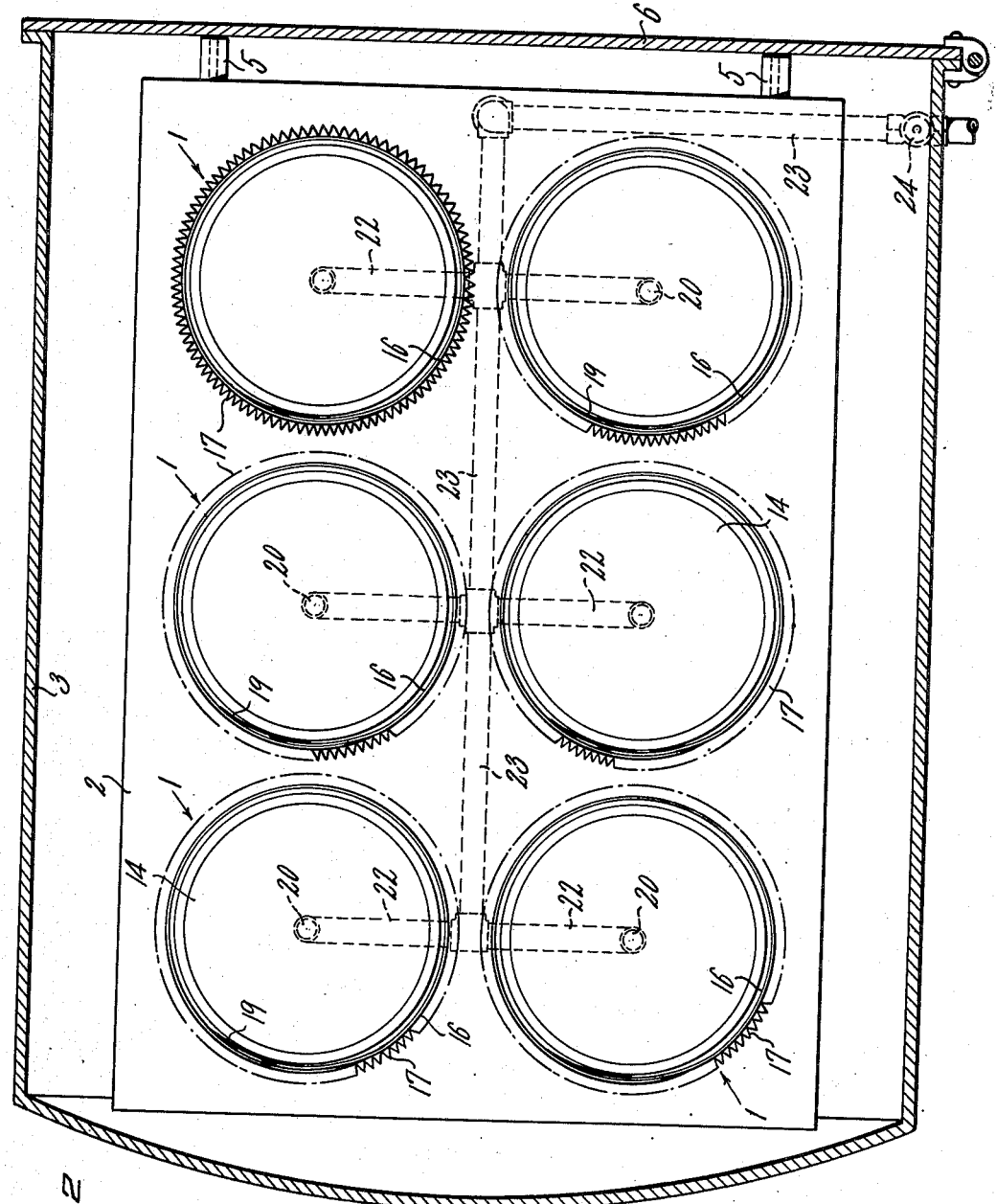

Patented Apr. 24, 1951

2,550,183

UNITED STATES PATENT OFFICE 2,550,183

APPARATUS FOR MOLDING V-BELTS

Harry A. Bourne, Philadelphia, Pa., assignor to United States Rubber Company, New York, N. Y., a corporation of New Jersey Application November 14, 1946, Serial No. 709,877

8 Claims. (Cl. 18—6)

The present invention relates to a molding apparatus for curing articles and more particularly to a method and apparatus for curing endless belts, or the like.

In the manufacture of endless belts, for example transmission belts, it has been customary to cure the fabricated belts on a mold unit which has been built up from a plurality of mold rings. The uncured belts are assembled in a series of mold rings which embrace all but the outer surfaces of the belts. In assembling the belts on such a mold, one belt is looped around the lowermost mold ring and then another mold ring is placed on top of the belt in which position it nests with the first ring. Additional belts and mold rings are stacked up in this manner, in any convenient number for easy handling. An arbor or spindle is then fastened between the outer rings to hold the assembly together. When thus assembled the belts are confined in groves formed by the mold rings but the outer surfaces of the belts are not confined. Under certain manufacturing processes heavy canvas strips, or the like, are wrapped tightly about the assembled belts and mold rings so that the belts are forced in the mold grooves under pressure. The belts are then cured in a vulcanizer under high pressure and heat.

In certain instances, the canvas strips have been replaced with a metal sleeve or band which is clamped around the assembled belts and mold rings to hold the belts in position. The operator tightens the band around the assembly to force the belts into the grooves and then places the assembly in a vulcanizer for curing.

The aforementioned processes of manufacture have the disadvantage that a considerable amount of time is required to wrap the canvas strips around the mold assembly. This time loss is repeated because it is necessary to unwrap the strips after the curing operation. Moreover, it is necessary to clamp the individual mold rings in stacked relationship by means of an arbor which extends through the hollow center portions of the mold rings. This is a time consuming operation. When a metal band is used, considerable time is consumed in tightening the band along the length of the mold assembly which must be done evenly to insure uniform quality of product.

The present invention overcomes the aforementioned difficulties with a considerable saving in manufacturing cost. It provides apparatus for curing belts in which it is unnecessary to apply a canvas strip to hold the belts in position and in which it is unnecessary to assemble the mold rings together by means of an arbor. The pressure to hold the outer surfaces of the belts in proper position during the curing process is derived from the pressure medium used during vulcanization and is not dependent upon any canvas strip or metal band which is applied prior to this operation by the operator.

When belts are assembled and cured according to the previous practices already described, the density and contour of the belt is determined to a considerable extent by the tightness or tension under which the outer canvas strip or band is applied around the mold. This tension is relied upon to hold the belt in position during the entire curing operation. The result of this process is that the belts may vary somewhat in contour and in quality depending upon the skill with which the outer band is applied. Moreover, when a canvas strip is used there is a tendency for the canvas to bulge slightly when compressing the belt carcass into the mold groove so that when completely cured the outer surface of the belt acquires a slightly curved configuration. The apparatus of the instant invention overcomes these difficulties by utilizing the pressure existent in the curing operation to force the belts into the grooves in the molds so that a very dense homogeneous belt is obtained having a perfectly symmetrical and uniform contour with the outer surface formed with a flat face. The apparatus gives a belt in which all the faces or sides are cured to an even smoothness so that the belt has a pleasing appearance.

Another object of my invention is the provision of a new and improved apparatus for curing endless belts in which the mold rings are held in assembled relationship by the curing pressures without the necessity of providing separate clamping means.

It is a further object of my invention to provide an arrangement for forcing the belts into the mold grooves during the curing operation by gradual application of heat and pressure thereby avoiding the necessity of relying on separate clamping means to hold the belts in position.

In the accompanying drawing:

Fig. 1 illustrates apparatus for curing belts assembled in accordance with my invention and in which the belts are shown in both the uncured and cured state;

Fig. 2 is a view of the interior of a vulcanizer showing a plurality of molding units in position for curing of the belts; and Fig. 3 is a sectional view of part of the apparatus taken along the line 3—3 of Fig. 1.

Referring now to Fig. 1 of the drawing, a plurality of molding units 1 are shown mounted on a carriage or table 2 which has been moved into the interior of a vulcanizing chamber 3. The carriage 2 is supported on rollers 4 which travel along guide rails 5 so that the loaded carriage may be easily moved into and out of the vulcanizing chamber 3. The arrangement is such that a considerable number of molding units may be mounted on the table, as illustrated in Fig. 2, thereby permitting vulcanization of a considerable number of belts at one time. A cover 6 seals the vulcanizing chamber during the curing process; it is held in position by a conventional latching mechanism (not shown).

Each molding unit comprises a plurality of hol-

After assembly of the belt carcasses and mold rings, a pressure plate or band 16 is wrapped around the assembly so that it rests against the outer surfaces of the belt carcasses, as shown in the right hand molding unit of Fig. 1. The pressure band is of a height to completely enclose the assembly and it is held in position by one or more coiled springs 17 which are simply snapped over the wrapped pressure band to encircle it and hold it in position. As shown in Fig. 3, the ends of the pressure band are tapered, as indicated at 18. When in assembled position they overlap one another and are held in this position by the clamping spring 17. A shim 19 is inserted between the inner edge of the pressure plate and the assembly of mold rings and belt carcasses. Its purpose is to prevent the bevelled edge 18 of the pressure plate from scratching or scoring the outer surfaces of the belt carcasses during the curing process.

The pressure band 16 is formed of flexible sheet when the carriage is placed in the vulcanizing chamber 3. Since the exhaust line 23 exhausts to the atmosphere through a valve 24, a differential pressure is set up in the mold ring assembly due to the fact that the opening 20 is at atmospheric pressure and the exterior of the mold ring assembly is subjected to the pressure of the curing medium such as steam.

During manufacture the molding units are placed over the openings 20 in the carriage 2 and the carriage is then placed in the vulcanizing chamber and a connection made between the exhaust manifold 22 and the exhaust line 23. High pressure steam is now admitted to the vulcanizing chamber through a conventional supply pipe 23a controlled by a valve 24a, the pressure being determined by the particular articles being cured. For certain types of belts, it has been found that steam under approximately 75 pounds pressure and with a corresponding temperature of about 312° F., provides a suitable curing medium. This is effective with belts of approximately 12" diameter in which the carcass is formed with laminations of textile cords and rubber with an outer sheath of textile fabric. It will be found, that the present invention is applicable for curing a wide variety of belt constructions as well as other rubber fabricated articles.

Referring now to the right hand molding unit shown in Fig. 1, it will be seen that as the live steam enters the vulcanizing chamber it will pass through a passageway 25 between the mold rings and the pressure band 16, past the belt carcasses 9 and then through the bleed holes 15 to the exhaust opening 20 in the table 2. The passageway 25 is formed due to the fact that the belt carcasses are made slightly over-sized to fit in the molding grooves 8 so that initially they hold the pressure band 16 spaced slightly from the outer surfaces of the mold rings. As the steam passes down between the pressure band and the mold rings a portion of the steam flows around the belt carcasses to heat them; some of this steam will flow between the individual rings to the exhaust opening. As the pressure in the vulcanizing chamber builds up the temperature increases rapidly so that the flow of steam around the belt carcasses tends to soften them. At the same time, a differential pressure is set up between the outer surface of the pressure band 16, which is subjected to the full pressure of the steam in the vulcanizing chamber and the interior chamber of the mold rings, which is maintained at substantially atmospheric pressure by virtue of the exhaust opening 20. A considerable pressure is now built up by the action of the steam on the pressure band 16 so that the band is squeezed around the belt carcasses into seated engagement with the mold rings. Thus the belt carcasses, which initially seat roughly in the mold grooves 8, as shown in the right hand mold unit of Fig. 1, are quickly forced into intimate contact with the surfaces of the mold grooves so that they assume their final shape, as indicated in the left hand unit of Fig. 1. The squeezing and molding action of the pressure band 16 is made possible by slippage between the overlapped bevelled ends 18. The shim 19 protects the belt carcasses from any damage during the curing process due to slight movement of the inner edge of the pressure band 16.

Another important feature of the invention is that as the steam pressure builds up, it acts on the pressure surface 14, forming part of the upper ring of the assembly, and forces it downwardly into engagement with the next adjoining mold ring. Hence the stack of mold rings are forced tightly together by the steam pressure imposed on the end ring 13. This eliminates any need of a separate arbor to hold the rings together. The steam pressure also tightly holds the mold unit in seated position on the sealing surface 21 so that there is no appreciable leakage of steam past the bottom mold ring into the interior of the assembly.

Thus it will be seen that during the curing process the differential pressure applied to the mold ring assemblies serves to force the belt carcasses into the molding grooves so that a very compact and homogeneous belt structure is obtained. The molding pressure directly applied to the belts is that obtained from the curing fluid acting on the relatively large area of the pressure band 16. Hence the pressures can be easily controlled by varying the pressure of the curing steam. At the same time the differential pressure acts to hold the mold rings in assembled relationship during the curing process.

It has been found that the differential pressure need not be applied to the assembly during the entire curing process once the belt carcasses have been molded tightly to the mold grooves. To this end, the valve 24 is closed midway of the curing time so that the openings 20 no longer exhaust to atmospheric pressure. This permits the pressure to build up in the interior of the mold assembly as a consequence of which a higher amount of heat is transferred from the steam to the inner walls of the mold rings. This tends to speed up the curing process since a greater amount of heat is transferred to the belt carcasses. Moreover, there is thus a more uniform heating of the entire mold surfaces.

An outstanding advantage of the present invention is that it produces belts having a uniform dense structure with highly polished outer surfaces obtained from the surfaces of the mold rings and the surface of the pressure band 16. The pressure on the pressure band is such as to force it down into contact with the outer surfaces of the mold rings 7 so that a flat smooth surface is imparted to the outer surface of the belt 9. This gives a belt of more uniform cross section and of better appearance than belts cured under the former process in which canvas strips were wrapped around the assembled belts and mold rings. Moreover, the pressure of the band 16 is high enough to extrude the excess rubber in the belt carcass completely through the minute openings in the outer fabric wrap. The extruded rubber helps in giving the exterior surfaces of the belt a smooth uniform appearance. Since the rubber is thoroughly impregnated in the interstices of the fabric cover, the life of the belt is materially increased due to the fact that friction between the strands of the fabric covering is reduced by the protective action of the rubber.

After the curing process is completed, the carriage 2 is removed from the vulcanizing chamber and the assemblies dismantled for removal of the cured belts. This may be easily accomplished by slipping the spring 17 off the pressure band 16 and then unwrapping the pressure plate. The mold rings are then removed one after the other. This causes separation of the parts of the molding grooves 8 permitting the cured belts to be readily removed. A saving in manufacturing costs may be obtained if the rings are reassembled with uncured belt carcasses during removal of the cured belts. For example, as the top ring 13 is removed it is placed in inverted position on the loading platform and an uncured belt carcass placed over the flange in the manner already described. Then as the second mold ring is removed it is reassembled on the end ring 13 and another uncured belt carcass placed in position. In this way the mold ring assemblies are dismantled and built up in what amounts to a single operation so that by the time all of the cured belts have been removed from the mold rings a new assembly of uncured belts and mold rings is obtained which is ready for application of the pressure band 16.

By using differential pressure in the manner described it has been possible to considerably simplify the process and apparatus required for the curing of endless belts with a consequent saving in manufacturing costs. No separate means is required to hold the mold rings together. The pressure of the vulcanizing medium applied to the pressure band 16 exerts a very high and uniform pressure on the exposed faces of the belt carcasses to force the carcass into intimate engagement with the mold grooves 8 thereby making it unnecessary to wrap the pressure plate 16 around the belt carcasses under pressure to force them into the molding grooves. The operator can easily wrap the pressure band 16 around the mold rings by hand and then slip the clamping springs 17 in position.

For the purposes of illustration, the invention has been disclosed as being utilized in the manufacture of V-belts. For this reason the mold rings have been provided with bevelled surfaces 12. However, it should be manifest that the invention is equally applicable to the curing of other articles and to belts having other configurations. In such cases the surfaces of the molds would be changed to accommodate the particular article. The process has been used in the manufacture of rectangular belts.

It will be apparent that the differential pressure process may be used with a mold assembly in which the mold grooves 8 are simply cut in a single hollow mold cylinder. In such instances, it is customary to build up the belt carcass directly on the mold groove. Then the pressure band 16 is applied and the mold placed in a curing chamber. The differential pressure acting on the pressure band will force the belt carcasses into intimate engagement with the mold surfaces in the manner already described.

In certain installations, it has been found that the differential pressure on the mold rings may be increased by applying a vacuum to the interior of the rings. This may be accomplished by attaching the line 22 to a vacuum pump.

Having thus described my invention, what I claim and desire to protect by Letters Patent is:

1. In apparatus for curing endless belts, or the like, an assembly of hollow mold rings nested together to form a chamber, one of said rings having means associated therewith providing a pressure surface closing one end of said chamber, the mold ring assembly being provided with a series of molding grooves for receiving the uncured belts, a support for the ring assembly closing the other end of said chamber and being provided with an exhaust opening, a pressure band wrapped around the ring assembly and adapted to rest on the exposed surfaces of the belts and means for applying heated fluid under pressure to pressure plate, ring assembly, and pressure surface, leakage of fluid past the pressure plate, belts and rings into the chamber being exhausted through said opening, the fluid pressure acting on the pressure plate to force the uncured belts into intimate contact with the molding grooves, the pressure of the fluid acting on said pressure surface to force and hold the mold rings together.

2. In apparatus for curing endless belts, or the like, an assembly of hollow mold rings nested together to form a chamber, one of said rings having means associated therewith providing a pressure surface closing one end of said chamber, the mold rings being provided with a series of molding grooves for receiving the uncured belts, a support for the ring assembly closing the other end of said chamber, a pressure band surrounding the ring assembly and resting on the exposed surfaces of the belts and means including a vessel for completely enclosing said support and ring assembly for applying a differential pressure between the exterior and interior of said ring assembly with the exterior pressure exceeding that of the interior, the exterior pressure squeezing the pressure band to force the uncured belts into intimate contact with the molding grooves and acting on the pressure surface to force and hold the mold rings together.

3. In apparatus for curing endless belts, or the like, an assembly of hollow mold rings nested together to form a chamber, one of said rings having means associated therewith providing a pressure surface closing one end of said chamber, the rings being provided with holes extending through the walls thereof, a support for the ring assembly closing the other end of said chamber and being provided with an exhaust opening, a pressure band surrounding the ring assembly and resting on the exposed surfaces of belts mounted on said assembly and means for applying heated fluid pressure to said pressure band, said ring assembly and said pressure surface, leakage of fluid through said holes providing a difference in pressure between the interior and the exterior of said mold rings whereby the pressure acting on the pressure band forces the uncured belts into intimate contact with the mold rings, and the pressure of the fluid acting on said pressure surface forces and holds the mold rings together.

4. In apparatus for curing endless belts, or the like, an assembly of hollow mold rings nested together to form a chamber, one of said rings having means associated therewith providing a pressure surface closing one end of said chamber, the mold rings being provided with a series of molding grooves for receiving the uncured belts, a support for the ring assembly closing the other end of said chamber and being provided with an exhaust opening, a pressure band surrounding the ring assembly and resting on the exposed surfaces of the belts, a curing vessel for receiving said support and ring assembly, and means for applying steam under pressure to the interior of said vessel, initial leakage of steam past the belts and rings into the chamber being exhausted through said opening whereby a difference in pressure is created between the interior and the exterior of said mold rings, the pressure of the steam acting on the pressure band to force the uncured belts into intimate contact with the molding grooves, the pressure of the steam acting on said pressure surface to force and hold the mold rings together.

5. In apparatus for curing endless belts, or the like, an assembly of hollow mold rings nested together to form a chamber, one of said rings having means associated therewith providing a pressure surface closing one end of said chamber, the mold rings being provided with a series of molding grooves for receiving the uncured belts, a support for the ring assembly closing the other end of said chamber and being provided with an exhaust opening, a metal pressure band wrapped around the ring assembly with overlapping edges and resting on the exposed surfaces of the belts, a shim between the inner end of the band and the belt surfaces, clamping means holding the band and shim in assembled relationship, a curing vessel for receiving said support and means for supplying high pressure steam to the interior of said vessel, the steam initially leaking past the belts and rings into the chamber and being exhausted through said opening whereby a difference in pressure is built up between the interior and exterior of said rings so that the steam acting on the pressure band squeezes it around the uncured belts to force them into intimate contact with the molding grooves, the pressure of the steam acting on said pressure surface to force and hold the mold rings together during the curing process.

6. In apparatus for curing endless belts, or the like, an assembly of hollow mold rings nested together to form a chamber, one of said rings having a pressure surface closing one end of said chamber, the mold rings being provided with a series of molding surfaces for receiving the uncured belts, means closing the other end of said chamber, means providing an exhaust passageway to said chamber, a metal pressure band wrapped around the ring assembly and resting on the exposed surfaces of the belts, and means for applying high pressure steam to said pressure band and the exterior surfaces of said mold rings, leakage of steam into said chamber being exhausted through said passageway whereby a difference in pressure is built up between the interior and exterior of said rings so that the steam acts on the pressure band to squeeze it around the uncured belts to force them into intimate contact with the molding surfaces, the pressure of the steam acting on said pressure surface to hold the mold rings together.

7. In apparatus for curing articles, an assembly of hollow mold rings nested together to form an interior chamber, one of said rings having means associated therewith providing a pressure surface closing one end of said chamber, the mold rings being provided with surfaces for receiving the articles, means for closing the other end of said chamber, means providing an exhaust opening to the interior of said chamber, and means for applying fluid acting on said pressure surface to force and hold the rings together.

8. In apparatus for curing and molding articles, a plurality of hollow mold members assembled together to form a chamber, the members being provided with a series of exterior molding surfaces for receiving the uncured articles, means providing an exhaust passageway to said chamber, a pressure band wrapped around the mold assembly and resting on the exposed surfaces of the articles, means for applying a high pressure and high temperature vulcanizing medium to said pressure band and the exterior of said mold assembly, leakage of said vulcanizing medium into said chamber being exhausted through said passageway so that a difference in pressure is built up between the interior and exterior of said mold members whereby the medium acts on the pressure band to squeeze it around the uncured articles to force them into said molding surfaces and means responsive to the pressure of said vulcanizing medium to force and hold said mold members together.

HARRY A. BOURNE.

REFERENCES CITED

The following references are of record in the file of this patent:

UNITED STATES PATENTS

| Number | Name | Date |
| --- | --- | --- |
| 1,354,738 | Gates | Oct. 5, 1920 |
| 1,998,817 | Meyer | Apr. 23, 1935 |
| 2,172,111 | Schick | Sept. 5, 1939 |
| 2,253,792 | Leavenworth | Aug. 26, 1941 |
| 2,292,290 | Robins | Aug. 4, 1942 |
| 2,324,991 | Groncy | July 20, 1943 |